United States Patent [19]

Kleehammer et al.

[11] Patent Number: 5,848,190
[45] Date of Patent: Dec. 8, 1998

[54] METHOD AND APPARATUS FOR LOCATING AND IDENTIFYING AN OBJECT OF INTEREST IN A COMPLEX IMAGE

[75] Inventors: Robert J. Kleehammer, Huntington; Steven Mandeli, Woodbury, both of N.Y.

[73] Assignee: Northrop Grumman Corporation, Los Angeles, Calif.

[21] Appl. No.: 645,937

[22] Filed: May 14, 1996

Related U.S. Application Data

[63] Continuation of Ser. No. 238,501, May 5, 1994, abandoned.
[51] Int. Cl.[6] ........................................................ G06K 9/62
[52] U.S. Cl. ............................ 382/218; 382/278; 382/291
[58] Field of Search ..................................... 382/209, 217, 382/218, 260, 262, 278, 291, 290; 364/728.03

[56] References Cited

U.S. PATENT DOCUMENTS 5,014,330  5/1991  Kobayashi et al. ..................... 382/209
5,319,723  6/1994  Bernsen et al. ........................ 382/217

OTHER PUBLICATIONS

Maragos, "Optimal Morphological Approaches to Image Matching and Object Detection." Second Int. Conf. on Computer Vision, pp. 695–699, Dec. 1988.

Khosravi et al., "Template Matching Based on Rank Order Operations." Proceedings of SPIE, Nonlinear Image Processing V, vol. 2180, pp. 186–197, May 1994.

*Primary Examiner*—Jon Chang
*Attorney, Agent, or Firm*—Terry J. Anderson; Karl J. Hoch, Jr.

[57] ABSTRACT

A method of location and identification of an object of interest in a complex image frame involves defining the object of interest as a reference template. The ranks of grey shades in the complex image frame and reference template are computed. The ranks of grey shades in the reference template are compared with the ranks of grey shades of the complex image, thereby determining closeness of fit. A threshold for detection is set by utilizing selected decision data.

15 Claims, 1 Drawing Sheet

METHOD AND APPARATUS FOR LOCATING AND IDENTIFYING AN OBJECT OF INTEREST IN A COMPLEX IMAGE

This is a continuation of application Ser. No. 08/238,501 filed on May 5, 1994 now abandoned.

BACKGROUND OF THE INVENTION

1. Field of the Invention

The present invention relates to a method and apparatus for locating and identifying an object of interest in a complex image. More particularly, the invention relates to the use of rank correlation to achieve such location and identification.

2. Prior Art

Many techniques for detecting objects in complex imagery have been developed throughout the years. Such techniques are computationally complex, requiring multiplications at relatively high accuracy. This has forced digital processors to employ complex algorithms, resulting in vastly increased hardware implementation and, therefore, costs.

Classically, registration techniques have been used for target detection, but these techniques have limitations. Moving target indication (MTI) and temporal differencing techniques are not useful for stationary, slow-moving, or radially-inbound targets, and can produce false alarms if the revisit time is long with respect to the scene stability. For targets of the aforementioned type, frame addition may be used, but there is a potential problem of background clutter components not being completely canceled, thus creating residues that act like real target detections, that is, false alarms.

None of the described techniques provides identification. Conventional correlation is a fundamental mathematical process for a wide variety of image processing functions, including 1) image registration, 2) background classification, 3) scene matching and 4) target detection. Although well defined, the direct application of digital correlation approaches is thwarted by the enormous magnitude of mathematical operations required for implementation, especially multiplications. For example, the correlation of two one-dimensional input signals, x(n) and y(n), which are defined for the interval $0 \leq n \leq N-1$ (and 0 outside the interval), is given as (L. R. Rabiner, "Correlation Method for Power Spectrum Estimation," IEEE Press, Programs for Digital Signal Processing, 1979)

$$R_{xy}(m) = \frac{1}{N} \sum_{n=0}^{N-1-m} [x(n) - \bar{x}][y(n+m) - \bar{y}] \quad 0 \leq m \leq L-1$$

where $\bar{x}$ and $\bar{y}$ are the estimated means of x(n) and y(n), that is:

$$\bar{x} = \frac{1}{N} \sum_{n=0}^{N-1} x(n)$$

$$\bar{y} = \frac{1}{N} \sum_{n=0}^{N-1} y(n)$$

and L equals the number of correlations lags of interest. Outside the interval $0 \leq m \leq L-1$ the functions are assumed to be zero.

The principal object of the invention is to provide a method and apparatus for locating and identifying an object of interest in a complex image, which method and apparatus are more simple than those of the prior art and exhibit superior performance than the prior art.

An object of the invention is to provide a method and apparatus for locating and identifying an object of interest in a complex image, which method and apparatus are independent of contrast variations in the image.

Another object of the invention is to provide a method and apparatus for locating and identifying an object of interest in a complex image, which method and apparatus are highly immune to false detection and provide an improved constant false alarm rate (CFAR) due to their being distribution-independent.

Still another object of the invention is to provide a method and apparatus for locating and identifying an object of interest in a complex image, which method and apparatus utilize simpler mathematical operations than those of the prior art and require no multiplications.

Yet another object of the invention is to provide a method and apparatus for locating and identifying an object of interest in a complex image, which method and apparatus provide a correlation output having a well-defined normal distribution.

Another object of the invention is to provide a method and apparatus for locating and identifying an object of interest in a complex image, which method and apparatus are independent of the level of grey scale encoding of the image.

Still another object of the invention is to provide a method and apparatus for locating and identifying an object of interest in a complex image, which method and apparatus are relatively insensitive to background clutter and, in fact, functions best in the presence of significant random background noise.

Yet another object of the invention is to provide a method and apparatus for locating and identifying an object of interest in a complex image, which method and apparatus are free from problems, such as, for example, scene stability associated with image registration techniques, since said method and apparatus are performed on individual frozen frames.

Another object of the invention is to provide a method and apparatus for locating and identifying an object of interest in a complex image, which method and apparatus do not depend on object movement.

Still another object of the invention is to provide a method and apparatus for locating and identifying an object of interest in a complex image, which method and apparatus involve a ranking process which reduces the image representation in amplitude by up to 50 to 1.

Yet another object of the invention is to provide a method and apparatus for locating and identifying an object of interest in a complex image, which method and apparatus have great utility and may be used on any image such as, for example, radar, visible, infra-red, X-ray or ultraviolet, regardless of its source or spectral band.

Another object of the invention is to provide a method and apparatus for locating and identifying an object of interest in a complex image, which method and apparatus are completely compatible with model-based processing and are thus usable in an extremely wide range of image applications.

Still another object of the invention is to provide a method and apparatus for locating and identifying an object of interest in a complex image, which method and apparatus require minimized hardware implementation and function in compatibility with vector, parallel and neuronal network processors.

BRIEF SUMMARY OF THE INVENTION

In accordance with the invention, a method of location and identification of an object of interest in a complex image comprises the steps of defining the object of interest as a reference template and computing the ranks of grey shades in both the complex image and the reference template. The ranks of grey shades in the reference template are compared with the ranks of grey shades of the complex image, thereby determining closeness of fit. A threshold for detection is set by utilizing selected decision data.

The reference template is defined by computation of the ranks of grey shades in the object of interest. The stages of the method are iterated over scene data.

In accordance with the invention, the apparatus for locating and identifying an object of interest in a complex image frame comprises an object model data base for defining the object of interest as a reference template. A sampler provides a sampled digitized image frame having an address. An incrementer controls the center of the digitized image. A rank generator replaces grey shade information in the complex image frame and the reference template with ranks, thereby providing a ranked template and a ranked scene sample of the complex image frame. A comparator/summer correlates the ranked template with the ranked scene sample of the complex image frame. An adaptive threshold generator/implementer utilizes data from the sampled image frame to provide a threshold number. A controller controls the object model data base and is controlled by the adaptive threshold generator/implementer, whereby the controller is informed by signal from the adaptive threshold generator/implementer if the correlation sum fails to exceed the threshold number. The controller causes the incrementer to increment the address of the sampled image frame. The incrementer informs the controller when a digitized image frame has been completely scanned, at which point the controller signals the object model data base to institute a new model as the reference template.

The object model data base has an input connected to the controller, a first output connected to the sampler and to the rank and report generators and a second output coupled to the controller. The sampler has a first input connected to the output of the object model data base, a second input connected to the incrementer and an output connected to the rank generator and to the adaptive threshold generator/implementer. The incrementer has a first output connected to the controller and a second output connected to the sampler and report generator. The rank generator has a first input connected to the output of the object model data base, a second input connected to the output of the sampler, a first output connected to the comparator/summer and a second output connected to the comparator/summer.

The comparator/summer has a first input connected to the first output of the rank generator, a second input connected to the second output of the rank generator and an output connected to the adaptive threshold generator/implementer. The adaptive threshold generator/implementer has a first input connected to the output of the sampler, a second input connected to the output of the comparator/summer and an output coupled to the controller. The controller has a first input connected to the incrementer, a second input coupled to the output of the adaptive threshold generator/implementer, a third input coupled to the output of the adaptive threshold generator/implementer and coupled to the second output of the object model data base and an output connected to the object model data base.

A report generator generates an object report containing identification data extracted from the reference template and location data from the incrementer. The report generator has a first input connected to the first output of the object model data base, a second input connected to the second output of the incrementer, a third input coupled to the output of the adaptive threshold generator/implementer and an output for providing the object report.

A first terminal inputs image frame update data to the object model data base and to the controller, a second terminal inputs digitized image frame data to the sampler. The report generator generates an object report containing identification data extracted from the reference template and location data from the incrementer. A third terminal outputs the object report from the report generator. The object model data base outputs the reference template at its first output and outputs a data base exhausted signal at its second output. The sampler outputs sampled image frame data at its output. The incrementer outputs an image scan complete signal at its first output and location data at its second output. The rank generator outputs ranked template data at its first output and ranked scene sample data at its second output. The comparator/summer outputs correlation data at its output. The adaptive threshold generator/implementer outputs ID status data at its output and the controller outputs new object/perspective select data at its output.

BRIEF DESCRIPTION OF THE DRAWINGS

Other objects and features of the present invention will become apparent from the following detailed description considered in connection with the accompanying drawing, which discloses a single embodiment of the present invention. It should be understood, however, that the drawing is designed for the purpose of illustration only and not as a definition of the limits of the invention.

In the drawing, wherein similar reference characters denote similar elements throughout the several views.

The single FIGURE

DETAILED DESCRIPTION OF PREFERRED EMBODIMENT

Figure 1:
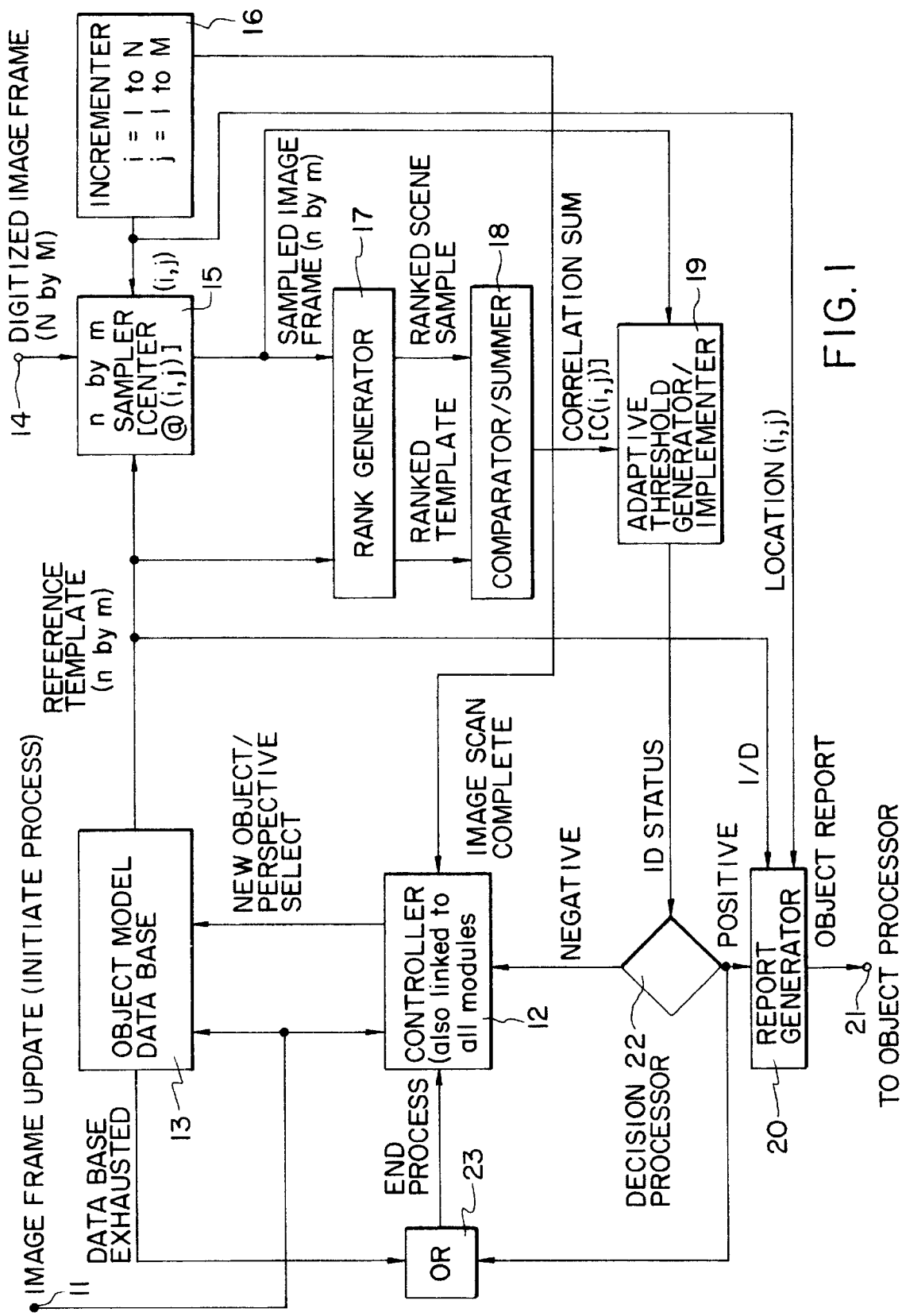
FIG. 1 is a block diagram of an embodiment of the apparatus of the invention for locating and identifying an object of interest in a complex image.

Rank correlation is a method of replacing data with a simple listing of "ranks," which describes how many other samples in the data set the sample exceeds in absolute level (E. L. Lehmann, "Nonparametrics: Statistical Methods Based On Ranks", McGraw-Hill Book Publishing Company, 1975). The result is like a "poll" describing how many samples it "beats." Rank correlation is an old approach almost exclusively used in the social sciences to analyze the qualitative results of opinion polls and political voting patterns, wherein data is generated by primarily subjective mechanisms. In such cases, rank correlation may be the only technique that can provide numerical correlation.

Symbolically, the ranking operation is denoted by the script R. The process of ranking the data in an array $S(i,j)$ of dimension n by m is then written as follows:

$$S'(i,j) = R[S(i,j)] \quad 0<i<n, \; 0<j<m \qquad (1)$$

where the resultant array $S'(i,j)$ is $S(i,j)$ with its elements transformed into ranks. Similarly, the operation of ranking the data in an array $T(i,j)$ is written as follows:

$$T'(i,j) = R[T(i,j)] \quad 0<i<n, \; 0<j<m \qquad (2)$$

The original arrays, $S(i,j)$ and $T(i,j)$, can be rank correlated by simply comparing the resultant rank arrays, $S'(i,j)$ and $T'(i,j)$ on an element-by-element basis, as follows:

If $T(i,j) = S'(i,j)$ then $C(i,j) = 1$  (3)

If $T(i,j) \neq S'(i,j)$ then $C(i,j) = 0$  (4)

wherein C(i,j) is the correlation array. The final step is to sum all the resultant elements of C(i,j) and normalize over the entire array as follows:

$$\text{Correlation Strength} = \frac{1}{N} \sum_{j=0}^{m} \sum_{i=0}^{n} c(i,j) \quad (5)$$

wherein N=n×m. If the resulting correlation strength approaches unity, then the original S and T arrays are "highly rank correlated" and the images are inherently similar. If the resulting correlation strength approaches zero, then the original S and T arrays are "highly rank decorrelated" and the images are inherently dissimilar.

In the foregoing discussion, if S(i,j) describes an image or scene, its elements being individual pixels, and T(i,j) describes the image of an object of interest, then, in the case of the correlation strength approaching unity, an object detection could be declared.

The present invention involves the innovative application of a modified rank correlation to the quantitative correlation of images. Rank correlation is a model based process, since it requires a-priori information about the object image. The object of interest can be obtained from a pre-calculated look-up-table (LUT), or can be calculated in real time from the faceted geometric model of the object by a suitable code. It may also be obtained from a previous image frame. Once the object of interest has been defined, the method of the invention involves the following steps:

1) Computation of the ranks of the grey shades contained in the object of interest, that is, creation of a reference template.
2) Computation of the ranks of the grey shades contained in the scene for the corresponding area in the template.
3) Comparison of the ranks of step 1 with the ranks of step 2 to determine closeness of fit.
4) Iteration of the procedure over the appropriate scene data.
5) Use of an appropriate, or a selected decision criteria, or data, to set the threshold for detection.

As shown in the figure, the process of rank correlation is initiated by an external signal, image frame update, inputted via a terminal 11. The image frame update signal is supplied to controller 12, which transmits the appropriate timing signals to all the modules and initiates the rank correlation process. The image frame update signal is also supplied to object model data base 13 to reset said data base to its beginning. At such time, a digitized image frame is supplied from an external source via a terminal 14 to sampler 15 of size n by m. Each of the controller 12, the object model data base 13, and the n by m sampler 15 may comprise any suitable known hardware and software.

Sampler 15 receives the values of n and m from the reference template n by m outputted by object model data base 13. Sampler 15 selects an n by m section of the digitized image frame, whose center (i,j) is determined by an incrementer 16 of any suitable known type. This section of the digitized image frame is outputted by sampler 15 as the sampled image frame n by m and inputted to a rank generator 17 of any suitable known type.

Controller 12 selects a model from the object model data base 13 and said object model data base feeds the selected model to rank generator 17 as the reference template. Rank generator 17 replaces grey shade information contained in the sampled image frame and reference template inputted to it with ranks and sends the resultant outputs, which are the ranked template and the ranked scene sample, to a comparator/summer 18 of any suitable known type.

Comparator/summer 18 correlates the ranked template with the sampled image frame, thereby producing a correlation sum [c(i,j)]. The correlation sum produced by comparator/summer 18 is supplied to an adaptive threshold generator/implementer 19 of any suitable known type. Adaptive threshold generator/implementer 19 uses data from the sampled image frame to provide a threshold number. If the correlation sum does not exceed the threshold, the ID status output of adaptive threshold generator/implementer 19 is determined as negative. In such cases, correlation process controller 12 is informed of this and causes incrementer 16 to increment the i,j address by 1 in i or j. The foregoing process continues, using the same reference template and an n by m sample of the digitized image frame of a new center i,j. As long as the ID status continues to be negative and i is equal to or less than N and j is equal to or less than M, the foregoing process continues.

When correlation process controller 12 is informed that the digitized image frame has been completely scanned, which occurs via an image scan complete from incrementer 16, said controller selects another object model from object model data base 13 and the process of correlation continues using the new model as the reference template. This process of selecting reference templates from object model data base 13 and correlating them with the sampled image frame continues until one of the following three things occurs.

1. All the models in the object model data base have been selected and processed, creating the data base exhausted signal, with negative ID results.
2. An image frame update occurs, which restarts the correlation process and initializes.
3. A positive ID occurs.

A positive ID informs a report generator 20, of any suitable known type, to generate an object report containing identification data extracted from the reference template, and location data i,j from incrementer 16. The object report is provided to an external object processor via a terminal 21.

The ID status output of adaptive threshold generator/implementer 19 is determined as negative or positive by a decision processor 22 of any suitable known type. The positive ID also is inputted to an OR gate 23 of any suitable known type. A data base exhausted signal output of object model data base 13 is also inputted to OR gate 23. The OR gate 23 produces an end process signal when a positive ID signal or a data base exhausted signal is received by OR gate 23. The end process signal is fed to controller 12 and causes the controller to end the identification/location process.

While a single embodiment of the present invention has been shown and described, it is to be understood that many changes and modifications may be made thereunto without departing from the spirit and scope of the invention as defined in the appended claims.

What is claimed is:

1. A method of locating and identifying an object of interest in a complex image frame, comprising the steps of:
   a. selecting a section of the complex image frame which defines a number of data points in a data set for the selected section, wherein each data point defines a data level of grey shade;
   b. computing ranks of grey shade for the data points in the data set for the selected section by ranking each sample data point in the data set for the selected section with respect to the number of other data points in the entirety of the data set for the selected section, the grey shade data levels of which are exceeded by the grey shade data level of the sample data point;

c. defining an object of interest as a single reference template having a number of data points in a data set for the reference template, wherein each data point defines a data level of grey shade;

d. computing ranks of grey shade in the reference template by ranking each sample data point in the data set for the reference template with respect to the number of other data points in the entirety of the data set for the reference template, the grey shade data levels of which are exceeded by the grey shade data level of the sample data point;

e. comparing the ranks of grey shade of said reference template with the ranks of grey shade of the selected section of said complex image, thereby determining closeness of fit; and f. detecting an object of interest when the comparison exceeds a threshold for detection.

2. A method as claimed in claim 1, wherein the complex image frame has N×M data points, and the reference template has n×m data points, which is less than the N×M data points, and the reference template is iteratively and incrementally compared with successive different sets of data points within the complex image frame N×M set of data points.

3. A method as claimed in claim 2, wherein the reference template is iteratively and incrementally compared with successive different sets of data points within the complex image frame by iteratively incrementing an address of a set of data points, having the same number of data points as the reference template, within the N×M set of data points.

4. An apparatus for locating and identifying an object of interest in a complex image frame, comprising:

a. an object model data base means for defining a plurality of objects of interest, each object of interest being defined as a single reference template having a number of data points in a data set, wherein each data point defines a data level of grey shade;

b. sampler means, receiving a complex image frame having a number of data points in a data set, greater than the number of data points in the reference template, wherein each data point defines a data level of grey shade, for providing a sampled digitized image frame, having the same number of data points as the reference template, and having an address defining the location of the sampled digitized image frame within the complex data frame;

c. incrementer means for incrementally and interactively controlling and moving the location of the sampled digitized image frame within the complex image frame, which is defined by an address, to interactively and incrementally compare the reference template with different sets of data points within the complex image frame;

d. rank generator means for replacing grey shade information in the sampled digitized image frame and also in the reference template with ranks, by ranking each sample data point in the data set for the sampled digitized image frame with respect to the number of other data points in the entirety of the data set for the sampled digitized image frame, the grey shade data levels of which are exceeded by the grey shade data level of the sample data point, and by ranking each sample data point in the data set for the reference template with respect to the number of other data points in the entirety of the data set for the reference template, the grey shade data levels of which are exceeded by the grey shade data level of the sample data point, thereby providing a ranked reference template and a ranked sampled digitized image frame;

e. correlating means for correlating the ranked template with the ranked sampled image frame and producing a correlation output signal indicative of the extent of correlation;

f. threshold generator/comparator means for providing a correlation threshold and comparing the correlation output signal with the correlation threshold, and producing an output signal indicating when the correlation output signal does not exceed the correlation threshold; and g. controller means for controlling said object model data base means and receiving an output signal from said threshold generator/comparator means, and responsive thereto said controller means causes said incrementer means to increment the address of said sampled image frame, and wherein said incrementer means informs said controller means when a sampled digitized image frame has been completely incrementally scanned over the entire data set of the complex image frame, and said controller means controls said object model data base means to replace the reference template with another reference template for another model of interest.

5. Apparatus as claimed in claim 4, further comprising report generator means for generating an object identification report containing identification data identifying the reference template from said object model data base means and location data from said incrementer means.

6. Apparatus as claimed in claim 4, wherein said object model data base means has an input said from controller means, a first output connected to said sampler means, said rank generator, and said report generator means, and a second output connected to said controller means.

7. Apparatus as claimed in claim 4, wherein said sampler means has a first input from said object model data base means, a second input from said incrementer means, and an output connected to said rank generator means and said threshold generator/comparator means.

8. Apparatus as claimed in claim 4, wherein said incrementer means has a first output connected to said controller means and a second output connected to said sampler means and said report generator means.

9. Apparatus as claimed in claim 4, wherein said rank generator means has a first input from said object model data base means, a second input from said sampler means, and first and second outputs connected to said correlating means.

10. Apparatus as claimed in claim 4, wherein said correlating means has a first input from a first output of said rank generator means, a second input from a second output of said rank generator means, and an output connected to said threshold generator/comparator means.

11. Apparatus as claimed in claim 4, wherein said threshold generator/comparator means has a first input from said sampler means, a second input from said correlating means, and an output coupled to said controller means.

12. Apparatus as claimed in claim 4, wherein said controller means has a first input from said incrementer means, a second input from said threshold generator/comparator means, a third input from said object model data base means, and an output connected to said object model data base means.

13. Apparatus as claimed in claim 4, wherein said report generator means has a first input from said object model data base means, a second input from said incrementer means, a third input from said threshold generator/comparator means, and an output for providing said object identification report.

14. Apparatus as claimed in claim 4, further comprising a first input terminal means for inputting an image frame update data signal to said object model data base means and to said controller means, a second input terminal means for inputting digitized complex image frame data to said sampler means, and a report generator means for generating an object identification report containing identification data identifying the reference template from said object model data base means and location data from said incrementer means, and an output terminal means for outputting the object identification report.

15. Apparatus as claimed in claim 4, wherein said object model data base means has a first output for outputting identification data on the reference template, and a second output for outputting a data base exhausted signal indicating that all reference templates for all objects of interest have been completely incrementally scanned over the entire complex image frame, said sampler means has an output for outputting sampled image frame data, said incrementer means outputs an image scan complete signal at a first output, indicating that a sampled digitized image frame has been completely incrementally scanned over the entire complex image frame, and location data at a second output, said rank generator means outputs ranked reference template data at a first output and ranked sampled digitized image frame data at a second output, said correlator means outputs correlation output signal data at an output, said threshold generator/comparator means outputs identification status data at an output, and said controller means outputs a signal indicating the selection of a new object of interest at an output coupled to said object model data base means.

* * * * *